UNITED STATES PATENT OFFICE.

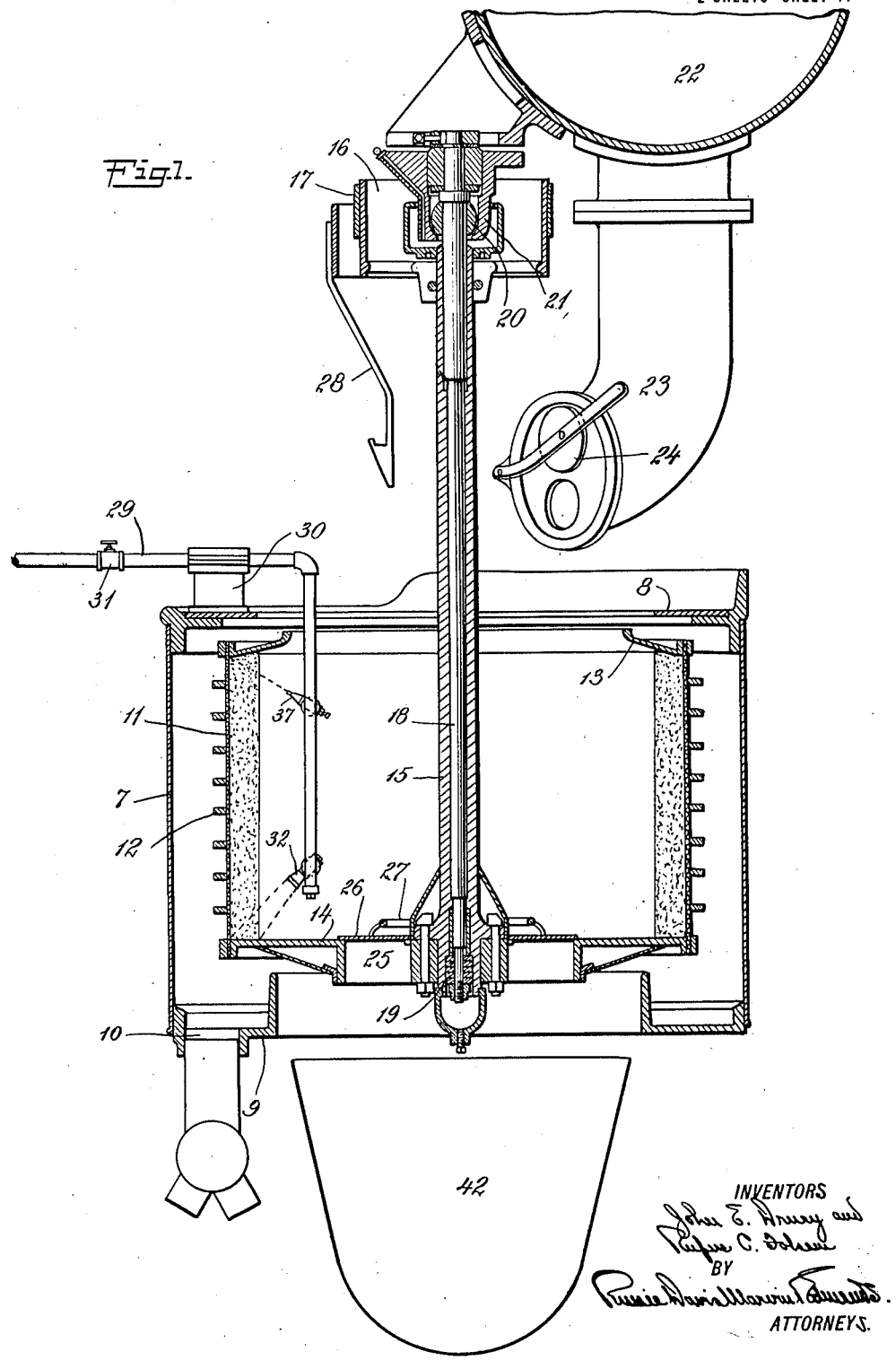
J. E. DRURY & R. C. FOLSOM.
METHOD AND APPARATUS FOR TREATING SUGAR.
APPLICATION FILED DEC. 28, 1917.
1,270,796.
Patented July 2, 1918.
2 SHEETS—SHEET 1.
INVENTORS
John E. Drury and
Rufus C. Folsom
BY
ATTORNEYS

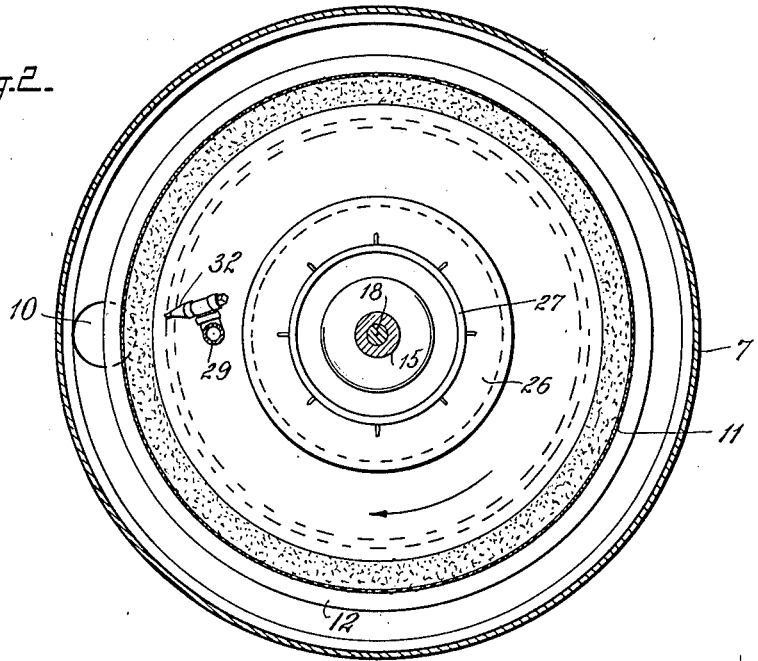
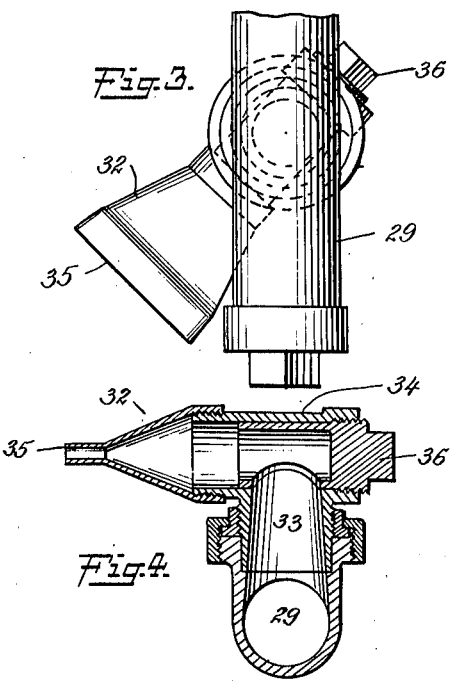
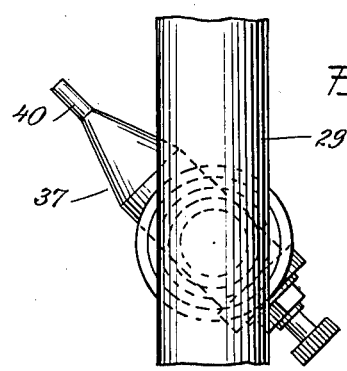
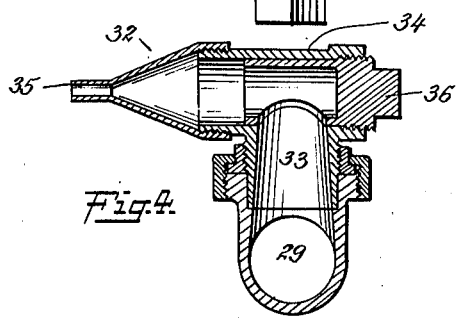
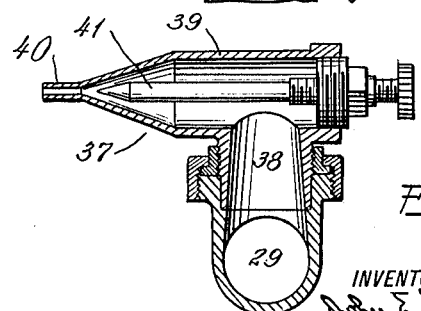

JOHN E. DRURY AND RUFUS C. FOLSOM, OF BOSTON, MASSACHUSETTS, ASSIGNORS TO THE AMERICAN SUGAR REFINING COMPANY, A CORPORATION OF NEW JERSEY.

METHOD AND APPARATUS FOR TREATING SUGAR.

1,270,796.   Specification of Letters Patent.   Patented July 2, 1918.

Application filed December 28, 1917.  Serial No. 209,284.

*To all whom it may concern:*

Be it known that we, JOHN E. DRURY and RUFUS C. FOLSOM, citizens of the United States, residing at Boston, county of Suffolk, and State of Massachusetts, have invented certain new and useful Improvements in Methods of and Apparatus for Treating Sugar; and we do hereby declare the following to be a full, clear, and exact description of the invention, such as will enable others skilled in the art to which it appertains to make and use the same.

This invention is directed to the provision of an improved method of and apparatus for treating sugar. The invention concerns particularly the treatment of moistened raw sugar in a centrifugal machine to separate the syrup from the sugar.

In the treatment of raw sugar in such centrifugal machines, it has been the common practice heretofore to admit a batch of sugar to the machine, then rotate the basket of the machine at high speed to throw off the syrup by centrifugal force, then open the valve at the bottom of the basket and then detach the wall of sugar that has become packed against the screen of the basket so that the sugar will fall by gravity through the open valve into the melting pot below where water is mixed with the sugar and the latter is melted. In detaching the wall of sugar after the rotation of the basket has been discontinued, it has been a common practice to use a hand tool, but a more usual procedure is to employ a mechanical plow which is moved down into the basket while the latter is rotating at a relatively low speed. The plow engages the packed wall of sugar at the top thereof while the basket is rotating thereby cutting away the sugar, and it is then lowered steadily until it reaches the bottom of the basket and all of the sugar is detached from the screen.

One of the objectionable characteristics of this procedure is that considerable wear on the screen of the basket occurs. The plow must be moved outwardly within the basket until its edge engages the screen surface so as to insure detaching all of the sugar. This results frequently in tearing the screen. Any bur or rough spot on the screen surface engaged by the edge of the plow as the basket rotates is apt to cause a break in the screen and repairing the screen in event of such a break to permit of continuing the screen in use is difficult or impossible.

Again, when the mechanical plow is employed, it is the common practice to place the screen in the basket loosely with the ends of the screen overlapping and the whole screen held in place by the centrifugal force incident to the high speed of rotation of the basket. Cutting the material for the screen to such a size as to make the ends abut and employing a mechanical connection between the ends cannot be resorted to as the plow would catch upon the parts projecting above the screen surface. When the screen is laid in the basket loosely, in accordance with the practice followed in connection with the use of the mechanical plow, it sometimes happens that sugar works in under the loose end of the screen and causes improper operation, as by preventing the plow from functioning properly or unbalancing the basket.

The present invention involves the use of a hydraulic jet for detaching the wall of sugar packed against the screen by the rotation of the basket, to allow the sugar to pass down through the valve in the bottom of the basket. By this practice a number of advantages are secured. The removal of the sugar from the basket may be accomplished in less time than that required for removal of the sugar with the mechanical plow. Also the screen may be fastened rigidly in place instead of having it loose within the frame of the basket; its ends may abut instead of being overlapped and may be clamped between two thin metallic plates which are screwed together. A far more important advantage, however, is that wear on the screens is greatly reduced. All of the wear incident to contact of the mechanical plow with the screen surface is eliminated. Furthermore, the treatment of raw sugar in a centrifugal machine is followed by melting the sugar in a melting pot after mixing water with the sugar and when water jets are employed for detaching the packed sugar from the screen surface of the basket, this reduces correspondingly the amount of water which must be introduced into the melting pot with the sugar. Also the introduction of water into the sugar within the centrifugal machine aids materially in keeping the bottom of the basket and the troughs leading down to the melting pot clean; this is of special importance because if sugar becomes caked upon the bottom of the basket, as has occurred frequently with the practice heretofore followed, the basket is apt to become unbalanced to such extent as to lead to wabbling in the bearings when a high speed of rotation is reached.

In accordance with the invention, a pipe is employed mounted permanently upon a stationary part of the centrifugal machine and extending downwardly within the basket. This pipe is supplied with water under high pressure, say a pressure of 80 to 100 pounds, and within the basket one or more jet openings are provided upon the pipe through which the water under pressure issues. These openings are positioned to direct the jets outwardly against the wall of sugar packed against the surface of the screen. Preferably the jet or jets are so directed that but little of the water will pass through the screen. If a jet be so directed as to cut away the sugar at the bottom of the wall, the upper portion of the wall will fall by gravity. In addition to the jet directed against the lower portion of the wall of sugar, it is desirable to employ a fine jet directed upwardly into the upper corner of the basket so as to detach any sugar which might otherwise remain embedded in the corner, notwithstanding the falling away of the balance of the upper portion of the wall of sugar.

In using a centrifugal machine provided with such a water pipe connection, the batch of sugar is admitted to the basket and the latter is rotated at high speed to throw off the syrup in the usual manner. This having been done, the valve at the bottom of the basket is opened and the water jets are turned on. The sugar at the bottom of the wall packed against the screen is detached by the high pressure jet of water and the portion of the wall above this drops by gravity and all of the sugar so detached passes out through the valve in the bottom of the basket and flows down into the melting pot where the water mixed with the sugar, together with such additional water as may be required, assists the melting operation. It will be noted that the water jets are turned on after the valve in the bottom of the basket has been opened; the procedure is sharply distinguished in this respect from that followed in the treatment of partially refined sugar in a centrifugal machine wherein water is sprayed upon the packed wall of sugar to facilitate the removal of syrup therefrom during the rotation of the basket and before the valve at the bottom of the basket is opened, this water passing through the screen surface with the syrup instead of passing through the valve with the sugar.

The method constituting the present invention will be better understood by reference to the following description taken in connection with the accompanying drawings which show the construction which is preferred for use in the practice of the process.

In these drawings, Figure 1 is a central vertical section of a centrifugal machine, a melting pot being indicated diagrammatically below the machine; Fig. 2 is a horizontal section of the centrifugal machine; Figs. 3 and 5 are detail views of portions of the water pipe extending down into the basket; Fig. 4 is a transverse section of the water pipe through the lower outlet, and Fig. 6 is a transverse section through the upper outlet.

Referring to these drawings, 7 indicates the casing or cylinder of the centrifugal machine. The top of the cylinder is partially closed by an annulus 8 forming a shelf extending inwardly from the cylindrical wall 7 a short distance. The bottom of the cylinder is partially closed by an annulus 9 in which is an outlet 10 for the syrup. The outlet 10 or the conduit leading therefrom may be provided with a syrup separator, as is indicated diagrammatically in Fig. 1, which permits of segregating two or more different grades or qualities of syrup.

Within the cylindrical casing is the rotary basket consisting of a cylindrical screen 11 sustained by rings 12. At the top of the basket is an annular top piece 13 extending inwardly from the cylindrical wall a short distance. The bottom 14 of the basket is secured to a hollow shaft 15 extending upwardly a substantial distance above the basket and carrying a pulley 16 on which a belt 17 runs to transmit rotary motion at high speed to the basket. The basket is mounted upon a shaft 18 extending through the hollow shaft 15 and having a bearing 19 at its lower end upon which the weight of the basket and the parts rotating therewith is received. Secured to the shaft 18 near its upper end is a spherical member 20 which is received in a bearing 21 suspended in any suitable manner from the overlying structure. The moistened raw sugar is admitted to the basket from a suitable receptacle 22 through a discharge outlet 23 provided with a valve 24. In the bottom of the basket is an annular opening 25 through which the sugar passes out of the basket. This opening is adapted to be closed by a valve 26 consisting of an annular plate adapted to rest upon the upper surface of the bottom plate 14 of the basket. On this valve 26 is an annular flange 27. Above the basket is a hook 28 extending downwardly from the supporting structure, the arrangement being group of centrifugal machines and troughs are provided for conveying the sugar from the more distant centrifugal machines to the melting pot. The water introduced into the sugar in the process of detaching the wall of sugar from the screen surface, passes down into the melting pot with the sugar and to the extent that such water is added to the sugar the water added in the melting pot incident to the melting of the sugar is reduced.

By this procedure in discharging centrifugal machines, the time incident to effecting the discharge is much less than that required for effecting the discharge either with a hand paddle or with the mechanical plow. The work of the operators is light and therefore more work can be accomplished by them. The wear on the apparatus is greatly reduced, particularly the wear on the linings or screen surfaces of the baskets. The decrease in wear is particularly important as compared to the wear incident to the use of the mechanical plow wherein the edge of the plow makes direct contact with the screen so that there is danger of tearing the screen and rendering it useless. The ends of the sheet forming the screen may be secured together as by clamping them between metal plates, thus eliminating the entrance of sugar under the end of the screen such as occurs when the screen is laid loosely within the basket, as required in connection with the use of the mechanical plow.

The whole apparatus is kept in a cleaner condition by reason of the use of water for effecting the discharge of the sugar. To a certain extent the apparatus is washed in each discharge operation. This is specially desirable in preventing caking of sugar upon the bottom of the basket which is not readily accessible; such an accumulation of sugar might unbalance the rotating element to such extent as to cause wabbling in the bearings at a high speed of rotation.

We claim:

1. The method of operating a centrifugal machine in the treatment of sugar which consists in admitting a batch of the sugar to the basket of the machine, rotating the basket at high speed to throw off the syrup, thereby causing the sugar to become packed against the screen of the basket, opening an outlet at the bottom of the basket, directing a jet of water against the wall of sugar packed against the screen while the said outlet is open to detach the sugar from the screen, and allowing the sugar and the water mixed therewith to pass by gravity through the open outlet; substantially as described.

2. The method of operating a centrifugal machine in the treatment of sugar which consists in admitting a batch of the sugar to the basket of the machine, rotating the basket at high speed to throw off the syrup, thereby causing the sugar to become packed against the screen of the basket, opening an outlet at the bottom of the basket, directing a jet of water against the lower portion of the wall of sugar packed against the screen while the said outlet is open to detach the lower portion of the wall of sugar, whereupon the upper portion of the wall becomes detached by gravity, and allowing all of the sugar and the water mixed therewith to pass through the open outlet; substantially as described.

3. The method of operating a centrifugal machine in the treatment of sugar which consists in admitting a batch of the sugar to the basket of the machine, rotating the basket, then opening an outlet at the bottom of the basket, then while the said outlet is open directing a jet of water under pressure against the sugar packed against the screen at such an angle as to detach the sugar from the screen without permitting a substantial portion of the water to pass through the screen, and allowing the sugar and the water mixed therewith to pass by gravity through the open outlet; substantially as described.

4. A centrifugal machine for treating sugar comprising the combination of a casing having an outlet, a rotary basket within the casing provided with a screen about the cylindrical surface thereof, a valve at the bottom of the basket, and hydraulic means for cutting away the wall of sugar packed against the screen and allowing it to pass down through the open valve comprising a pipe permanently mounted on a stationary part of the machine and extending downwardly within the basket and provided with an outlet for directing a jet of water under pressure against the wall of sugar, and a conduit connected to the pipe for carrying water thereto; substantially as described.

5. A centrifugal machine for treating sugar comprising the combination of a casing having an outlet, a rotary basket within the casing provided with a screen about the cylindrical surface thereof, a valve at the bottom of the basket, a pipe mounted independently of the basket and extending downwardly within the basket, and means for cutting away the sugar packed against the screen surface hydraulically without allowing a substantial proportion of the water employed to pass through the screen consisting of an outlet on the pipe within the basket, for directing a jet of water under pressure outwardly and downwardly toward the lower edge of the screen surface, and a conduit for supplying water under pressure to the pipe; substantially as described.

6. A centrifugal machine for treating sugar comprising the combination of a casing having an outlet, a rotary basket within the casing provided with a screen about the such that the annular valve 26 may be lifted from its closed position upwardly out of the basket and suspended from the hook 28 by engaging the flange 27 over the hook. All of the parts so far described may be of the usual or any suitable construction.

A water pipe is shown at 29 permanently mounted upon a stationary part of the apparatus, as, for instance, by being clamped in a support 30 rising from the top piece 8 of the cylindrical casing. This pipe is provided with a valve 31. The pipe extends downwardly into the basket, as shown in Fig. 1, to a point near the bottom of the basket. Within the basket the pipe 29 is provided with two outlets, one directed downwardly and the other directed upwardly. The lower outlet 32 is arranged to direct a jet of water under pressure outwardly against the lower portion of the wall of sugar packed against the screen surface 11 of the basket. The jet from this outlet is preferably directed toward the lower edge of the screen, as indicated by the dotted lines in Fig. 1, so that a relatively small amount of the water will pass through the screen surface 11. Also, the outlet 32 is inclined horizontally at such an angle that the jet of water issuing therefrom moves in a direction opposite to that of the movement of the wall of sugar when the basket is rotated. The direction of rotation of the basket is indicated by the arrow on Fig. 2. The angle of inclination of the jet, that is, the angular displacement of the jet from the radius of the basket passing through the outlet, may be small, as is indicated in Fig. 2, but it is desirable that the jet be directed against the travel of the sugar. A construction which may be employed in the outlet 32 is indicated in Figs. 3 and 4. The pipe 29 is shown as provided with a lateral connection 33 entering a cylindrical member 34 which is inclined downwardly. At the end of this cylindrical member is a nozzle 35 terminating in a slot which is elongated in the vertical direction. At the end of the casing 34 opposite the nozzle 35 a valve 36 may be threaded into the casing 34, this valve being so constructed that it may be turned to a position for cutting off the opening through the lateral connection 33 more or less so as to vary the rate of flow of the water through the nozzle.

The upper outlet 37 is arranged to direct a jet of water outwardly against the upper portion of the wall of sugar packed against the screen surface 11 of the basket. The function of this upper jet is to detach any sugar which may remain packed in the corner of the basket at the upper edge of the screen when the remainder of the upper portion of the wall of sugar falls away, and for this purpose a very small upper jet will suffice. A jet issuing from an opening considerably less than one-eighth of an inch in diameter under a pressure of 80 to 100 pounds is sufficient for the accomplishment of the purpose above stated. The upper outlet 37 is inclined upwardly so that the jet issuing therefrom is directed into the corner of the basket at the upper edge of the screen, as indicated by the dotted line on Fig. 1. This upper outlet may be constructed as indicated in Figs. 5 and 6. As here shown, the pipe 29 is provided with a lateral connection 38 entering a chamber 39 provided with a small outlet 40. The freedom of flow of water through this outlet may be regulated as desired by means of a valve 41 threaded into the casing 39.

In the use of this apparatus the valve 26 at the bottom of the basket is closed and the valve 23 governing the admission of sugar to the basket is held open while a charge of moistened raw sugar is admitted to the basket. The basket is then rotated at high speed so as to throw off the syrup and the sugar remaining in the basket becomes packed against the cylindrical screen surface of the basket, as is indicated in Figs. 1 and 2. The valve 26 is then opened by grasping the flange 27 and lifting the whole valve until the flange may be caught over the hook 28 to sustain the valve in this elevated position. Water under pressure is then admitted to the pipe 29 by opening the valve 31 and this water issues from the outlets 32 and 37 in the form of powerful jets. Preliminary to turning on the water, the speed of rotation of the basket is greatly reduced. The jet issuing from the lower outlet is in the form of a sheet elongated in the vertical direction. This jet of water cuts into the wall of sugar at the lower portion thereof and detaches the sugar. But a small portion of the water of this jet passes through the screen by reason of the fact that the jet is directed downwardly toward the lower portion of the wall of sugar and the jet is made the more effective by reason of the fact that it is directed against the movement of the wall of sugar as the basket rotates. When the lower portion of the wall of sugar is cut away in this manner, the upper portion of the wall, being no longer supported, drops away from the screen surface by gravity. Any small amount of sugar which may remain in the corner of the basket at the upper edge of the screen surface is cut away by the fine jet issuing from the upper outlet 37. The sugar thus detached drops down by gravity through the open outlet 25 from the basket and into the melting pot below the centrifugal machine. Such a melting pot is indicated diagrammatically at 42 in Fig. 1. It will be understood, however, that the melting pot is of considerably greater size than is indicated in Fig. 1. Usually a melting pot is common to a whole cylindrical surface thereof, a valve at the bottom of the basket, a pipe mounted independently of the basket and extending downwardly within the same and means for cutting away the sugar packed against the screen surface hydraulically without allowing a substantial proportion of the water employed to pass through the screen consisting of an opening on the pipe for directing a jet of water outwardly and downwardly toward the lower edge of the screen surface, and means for removing sugar adhering within the corner of the basket at the upper edge of the screen; substantially as described.

7. A centrifugal machine comprising the combination of a casing having an outlet, a rotary basket within the casing provided with a screen about the cylindrical surface thereof, a valve at the bottom of the basket, a pipe mounted independently of the basket and extending downwardly within the same, and two outlets on the pipe within the basket for directing jets of water outwardly against the sugar packed against the screen of the basket, the upper outlet being arranged to direct a jet of water upwardly toward the upper edge of the screen; substantially as described.

8. A centrifugal machine for treating sugar comprising the combination of a casing having an outlet, a rotary basket within the casing provided with a screen about the centrifugal surface thereof, a valve at the bottom of the basket, and hydraulic means for cutting away the wall of sugar packed against the screen and allowing it to pass down through the open valve, comprising a pipe permanently mounted independent of the rotary basket and extending downwardly within the basket and two outlets from the pipe within the basket for directing jets of water under pressure outwardly toward the sugar packed against the screen, the lower outlet being arranged to direct its jet downwardly toward the lower edge of the screen surface and the upper outlet being arranged to direct its jet upwardly toward the upper edge of the screen surface; substantially as described.

9. A centrifugal machine for treating sugar comprising the combination of a casing having an outlet, a rotary basket within the casing provided with a screen about the centrifugal surface thereof, a valve at the bottom of the basket, and means for cutting away the sugar packed against the screen surface hydraulically without allowing a substantial portion of the water employed to pass through the screen, consisting of a pipe mounted independently of the basket and extending downwardly within the basket, and an outlet from said pipe in the form of a vertically elongated slot positioned for directing a jet of water issuing from the outlet outwardly in the form of a sheet and downwardly toward the lower edge of the screen surface; substantially as described.

10. A centrifugal machine for treating sugar comprising the combination of a casing having an outlet, a rotary basket within the casing provided with a screen about the cylindrical surface thereof, a valve at the bottom of the basket, and hydraulic means for cutting away the wall of sugar packed against the screen and allowing it to pass down through the open valve comprising a pipe mounted independently of the basket and extending downwardly within the same, and an outlet from said pipe in the form of a vertically elongated slot positioned for directing a jet of water issuing from the outlet outwardly in the form of a sheet; substantially as described.

11. A centrifugal machine for treating sugar comprising the combination of a casing having an outlet, a rotary basket within the casing provided with a screen about the cylindrical surface thereof, a valve at the bottom of the basket, a pipe mounted independently of the basket and extending downwardly within the same, and an outlet from the pipe for directing a jet of water outwardly and upwardly into the corner of the basket at the upper edge of the screen; substantially as described.

In testimony whereof we affix our signatures.

JOHN E. DRURY.
RUFUS C. FOLSOM.